(12) United States Patent
Tsai et al.

(10) Patent No.: US 11,534,729 B2
(45) Date of Patent: Dec. 27, 2022

(54) DISPERSION DEVICE AND SLURRY DISPERSION SYSTEM

(71) Applicant: INDUSTRIAL TECHNOLOGY RESEARCH INSTITUTE, Hsinchu (TW)

(72) Inventors: Ching-Lung Tsai, Taichung (TW); Keng-Yang Chen, Zhudong Township (TW); Cheng-Hung San, Xinpu Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 209 days.

(21) Appl. No.: 16/731,349

(22) Filed: Dec. 31, 2019

(65) Prior Publication Data
US 2021/0197148 A1   Jul. 1, 2021

(51) Int. Cl.
*B01F 29/00*   (2022.01)
*B01F 29/87*   (2022.01)
*B01F 23/53*   (2022.01)
*B01F 29/90*   (2022.01)

(52) U.S. Cl.
CPC .............. *B01F 29/87* (2022.01); *B01F 23/53* (2022.01); *B01F 29/90* (2022.01); *B01F 29/4032* (2022.01); *B01F 29/40221* (2022.01); *B01F 29/40354* (2022.01)

(58) Field of Classification Search
CPC .......... B01F 3/1221; B01F 7/168; B01F 9/20; B01F 9/22; B01F 9/0001; B01F 2009/0061; B01F 2009/0074; B01F 2009/0092; B01F 2009/009; B01F 23/53; B01F 27/861; B01F 29/10; B01F 29/4022; B01F 29/40221; B01F 29/4032; B01F 29/40354; B01F 29/87; B01F 29/90
USPC .... 366/136, 137, 176.1, 197, 208, 209, 226, 366/234, 236, 340; 210/497.01
See application file for complete search history.

(56) References Cited

U.S. PATENT DOCUMENTS

| | | | |
|---|---|---|---|
| 206,938 A | * | 8/1878 | Emory ............... B01D 39/1623 210/489 |
| 4,347,032 A | | 8/1982 | Possell |
| 5,582,484 A | | 12/1996 | Asa |

(Continued)

FOREIGN PATENT DOCUMENTS

| CN | 102580593 A | 7/2012 |
|---|---|---|
| CN | 203469897 U | 3/2014 |

(Continued)

OTHER PUBLICATIONS

Tsai Chin-Lung, Translated Specification and Claims of Patent Application, TWM539423U (Year: 2017).*

(Continued)

*Primary Examiner* — Anshu Bhatia
(74) *Attorney, Agent, or Firm* — Birch, Stewart, Kolasch & Birch, LLP

(57) ABSTRACT

A dispersion device is provided, including a container and a porous dispersion structure. The container has a first receiving space. The porous dispersion structure has at least three porous dispersion layers and has a second receiving space, wherein the porous dispersion structure is located in the first receiving space of the container.

12 Claims, 10 Drawing Sheets

(56) References Cited

U.S. PATENT DOCUMENTS

| | | | | |
|---|---|---|---|---|
| 2003/0072212 | A1* | 4/2003 | Wood | B01F 3/04539 366/170.3 |
| 2005/0242218 | A1* | 11/2005 | Nakano | B01F 27/50 241/46.08 |
| 2010/0310665 | A1* | 12/2010 | Watson | A61K 31/58 424/489 |
| 2012/0195159 | A1* | 8/2012 | Kitayoshi | B01F 27/941 366/279 |
| 2014/0192614 | A1* | 7/2014 | Kamiya | B01F 7/0075 366/302 |
| 2020/0139314 | A1* | 5/2020 | Langstrand | C23C 14/0676 |
| 2020/0222865 | A1* | 7/2020 | Kamiya | B01F 27/272 |

FOREIGN PATENT DOCUMENTS

| | | | |
|---|---|---|---|
| CN | 103801209 | A * | 5/2014 |
| CN | 101715363 | B | 7/2014 |
| CN | 105170002 | A | 12/2015 |
| CN | 206424802 | U | 8/2017 |
| CN | 208494010 | U | 2/2019 |
| JP | 57-45331 | A | 3/1982 |
| TW | 386901 | B | 4/2000 |
| TW | I260387 | B | 8/2006 |
| TW | I334360 | B | 12/2010 |
| TW | 201240720 | A1 | 10/2012 |
| TW | I526243 | B | 3/2016 |
| TW | M539423 | U | 4/2017 |
| TW | 201932177 | A | 8/2019 |

OTHER PUBLICATIONS

Liu X, Translated Patent Application of CN 103801209 A (Year: 2014).*
Taiwanese Office Action and Search Report for Taiwanese Application No. 108148546, dated Jan. 11, 2021.
Chinese Office Action and Search Report for Chinese Application No. 201911420769.8, dated Mar. 18, 2022.

* cited by examiner

DISPERSION DEVICE AND SLURRY DISPERSION SYSTEM

TECHNICAL FIELD

The application relates in general to a dispersion device and a slurry dispersion system, and in particular to a dispersion device and a slurry dispersion system having a porous dispersion structure including a plurality of layers.

BACKGROUND

Slurry (such as an active material or carbon black) has characteristics such as high surface area and high structure, and is easy to agglomerate in solution, making it difficult to prepare a uniformly dispersed slurry. The traditional technology for slurry dispersion will have a dead zone, which will cause the large particles to aggregate, uneven, and settle down. Therefore, it will reduce stability and storage stability and may also cause slurry loss or ratio changes. Or, the nano-sized particle size slurry prepared by nano-milling may be aggregated into larger particles again during storage and transportation due to internal cohesion, so that the physical properties of the slurry (such as viscosity or particle size distribution) changes and deviate from the initial uniform dispersion, resulting in variation in subsequent applications. In addition, after the slurry is left to stand for a period of time, its viscosity will have a larger variation compared to the viscosity of the slurry at the initial time, which also affects subsequent applications. Therefore, a slurry dispersion device is urgently needed to provide to uniformly disperse slurry.

SUMMARY

To address the deficiencies of conventional products, an embodiment of the invention provides a dispersion device is provided, including a container and a porous dispersion structure. The container has a first receiving space. The porous dispersion structure has at least three porous dispersion layers and has a second receiving space, wherein the porous dispersion structure is located in the first receiving space of the container.

In some embodiments, the porous dispersion structure includes: a first porous dispersion layer, having a first pore size; a second porous dispersion layer, having a second pore size; and a third porous dispersion layer, having a third pore size, wherein the second pore size is different from the first pore size or the third pore size.

In some embodiments, the second porous dispersion layer is located between the first porous dispersion layer and the third porous dispersion layer, and the second pore size is smaller than the first pore size and the third pore size.

In some embodiments, the first pore size is larger than the third pore size.

In some embodiments, the ratio of the first pore size, the second pore size, and the third pore size is between 3.1:1:2.1 to 12:1:3.

In some embodiments, the first pore size is smaller than the third pore size.

In some embodiments, the ratio of the first pore size, the second pore size, and the third pore size is between 2.1:1:3.1 to 3:1:12.

In some embodiments, the thickness of the second porous dispersion layer is between 50 μm~500 μm.

In some embodiments, the center lines of the first pore, the second pore, and the third pore are located on the same axis, and the axis is perpendicular to a central axis of the porous dispersion structure.

In some embodiments, the porous dispersion structure has a central axis, wherein in a direction that is perpendicular to the central axis of the porous dispersion structure, a first pore of the first porous dispersion layer, a second pore of the second porous dispersion layer, and a third pore of the third porous dispersion layer at least partially overlaps.

In some embodiments, wherein one of the porous dispersion layers of the porous dispersion structure has two regions: a first region and a second region, which are arranged along a central axis of the porous dispersion structure, and the porous dispersion layer has a plurality of first pores located in the first region and a plurality of second pores located in the second region, wherein the shape of the first pores is different from the shape of the second pores.

In some embodiments, wherein the area ratio of the first region to the second region is 3:7 to 7:3.

In some embodiments, wherein one of the porous dispersion layers of the porous dispersion structure has a plurality of pores with different pore sizes, and the sizes of the pores decrease in order along an opening direction of the second receiving space.

In some embodiments, wherein the pore shape of the porous dispersion layers has a polygonal shape, and the polygonal is triangle, quadrilateral, pentagon, hexagon, or heptagon.

An embodiment of the invention provides a slurry dispersion system, configured to disperse a slurry, comprising: a rotation device and a dispersion device. The rotation device is configured to contain the slurry, includes: a container and a porous dispersion structure. The container is provided on the rotation device and having a first receiving space, and the porous dispersion structure has at least three porous dispersion layers and a second receiving space, and the porous dispersion structure is located in the first receiving space of the container. When the rotation device rotates, the rotation device drives the dispersion device to rotate to disperse the slurry.

DETAILED DESCRIPTION

The making and using of the embodiments of the devices and systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
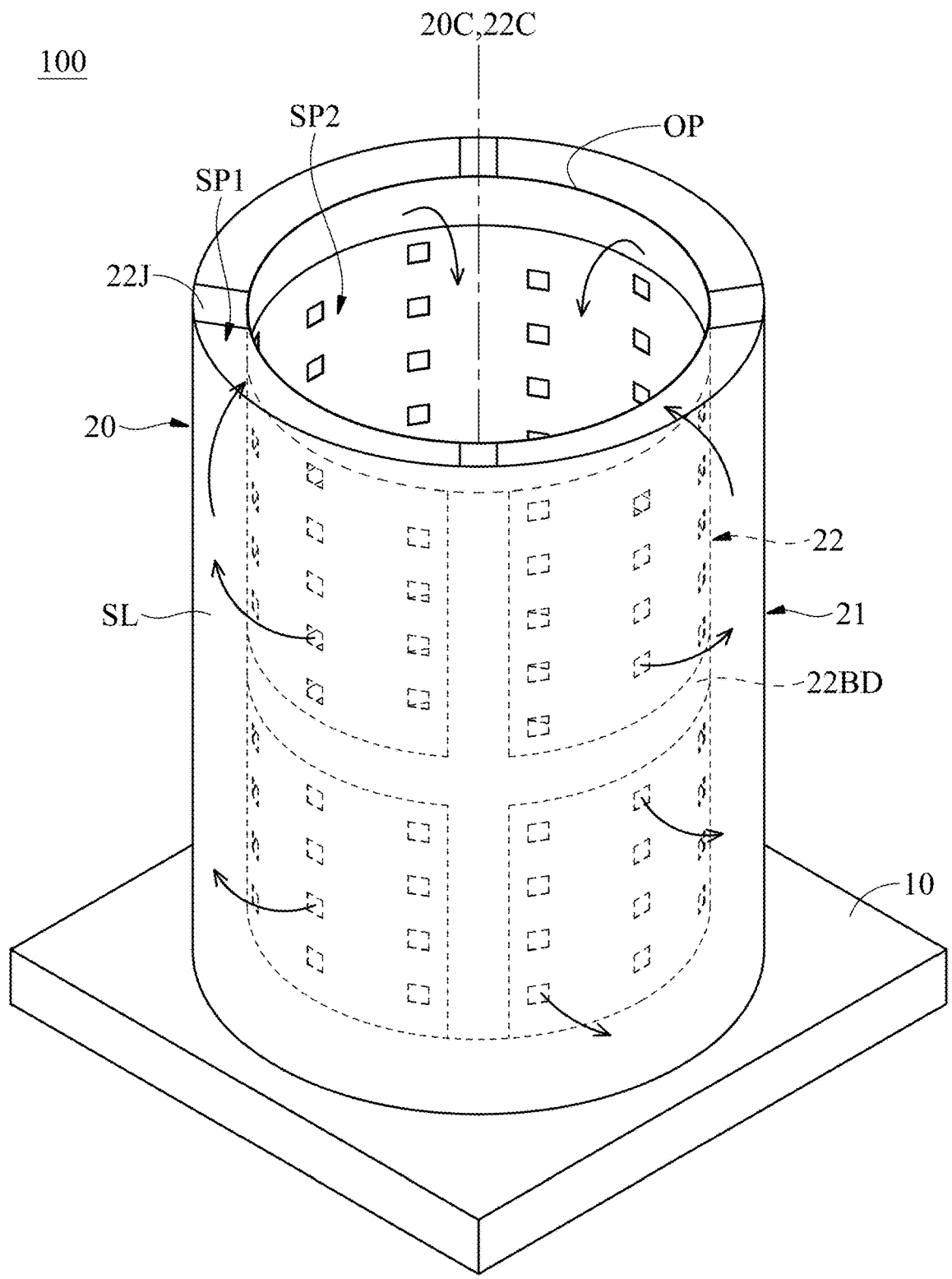
FIG. 1 is a schematic diagram showing a slurry dispersion system according to an embodiment of the present invention.

Referring to FIG. 1, which is a schematic diagram showing a slurry dispersion system 100 according to an embodiment of the present invention. The slurry dispersion system 100 can be used to disperse a slurry (for example, including a solvent and carbon black or a lithium battery active material or a binder or an additive) into smaller particles. The slurry dispersion system 100 includes a rotation device 10 and a dispersion device 20. The dispersion device 20 is disposed on the rotation device 10. The rotation device 10 can be a rotation platform for rotating the dispersion device 20, and the dispersion device 20 can be loaded with the aforementioned slurry. When the dispersion device 20 is loaded with the slurry and the dispersion device 20 is rotated by the rotation device 10, thereby the slurry can be dispersed. The structure of the aforementioned slurry dispersion system 100 will be described in detail below.

The dispersion device 20 of the slurry dispersion system 100 includes a container 21 and a porous dispersion structure 22. The container 21 may be a loader having a cylindrical appearance, may load the slurry SL and has a first receiving space SP1. The porous dispersion structure 22 is disposed in the first receiving space SP1. In some embodiments, the porous dispersion structure 22 has a joint portion 22J extending in a direction perpendicular (and including substantially perpendicular) to a main axis 20C of the dispersion device 20, so that the container 21 and the porous dispersion structure 22 are connected and make the porous dispersion structure 22 is disposed in the container 21. In some embodiments, the joint portion 22J may form an engaging mechanism with the edge of the container 21 to engage in an engaging manner. In other embodiments, the joint portion 22J includes a locking hole and a joint member, and is attached to the container 21 through a locking way.

Figure 2:
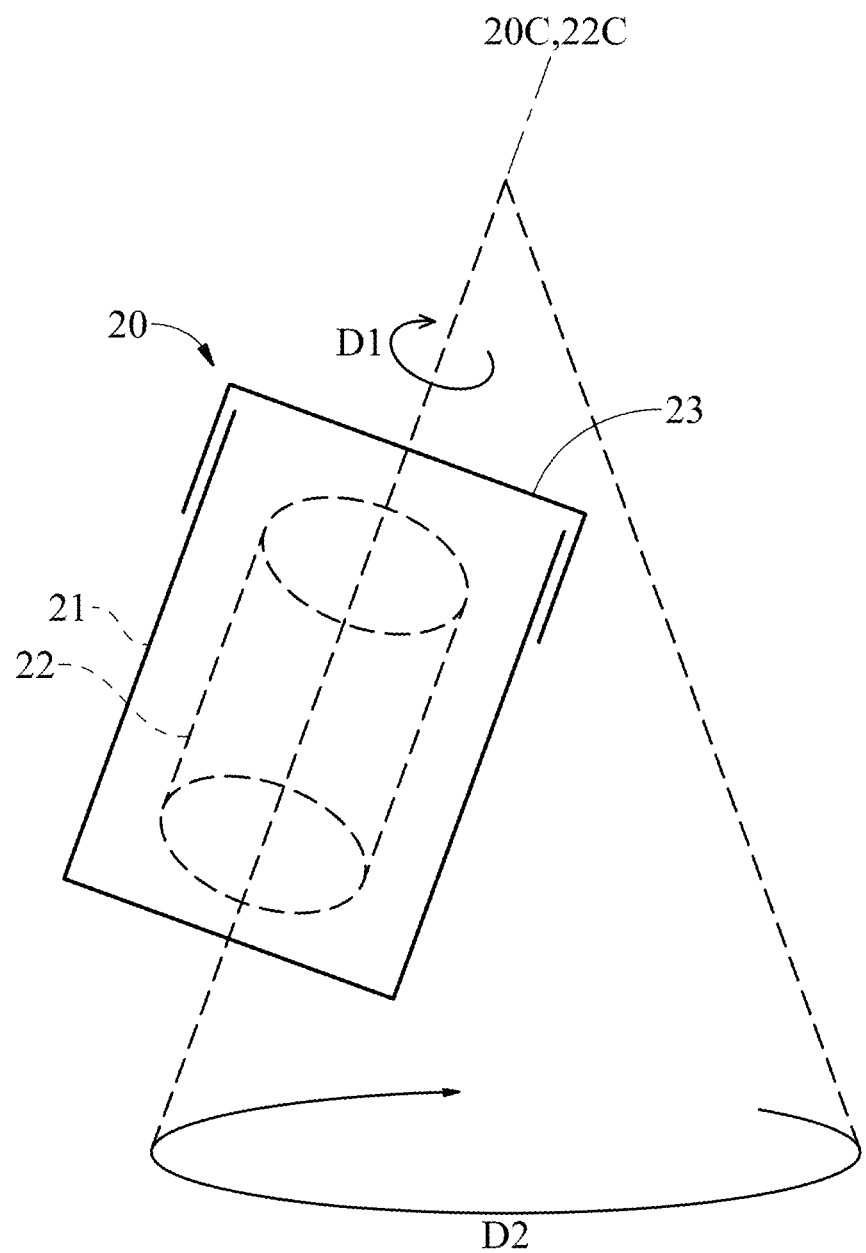
FIG. 2 is a schematic diagram of the dispersion device rotates to disperse the slurry.

Regarding the rotation device 10 of the slurry dispersion system 100, it may be a planetary rotation mechanism. As shown in FIG. 2, the dispersion device 20 can be rotated around its main axis 20C by the rotation device 10, such as the first rotation direction D1. In addition, the rotation device 10 can also drive the dispersion device 20 to rotate along a second rotation direction D2. In this way, the slurry dispersion system 100 has the effects of rotation (in the first rotation direction D1) and revolution (in the second rotation direction D2). In some embodiments, the aforementioned first rotation direction D1 and the second rotation direction D2 may each be rotated clockwise or counterclockwise, or the first rotation direction D1 and the second rotation direction D2 may be turned at the same time or oppositely at the same time in the manufacturing process to greatly enhance the ability to disperse the slurry SL. In some embodiments, as shown in FIG. 2, the dispersion device 20 may further include an outer cover 23 disposed on the container 21.

Figure 3:
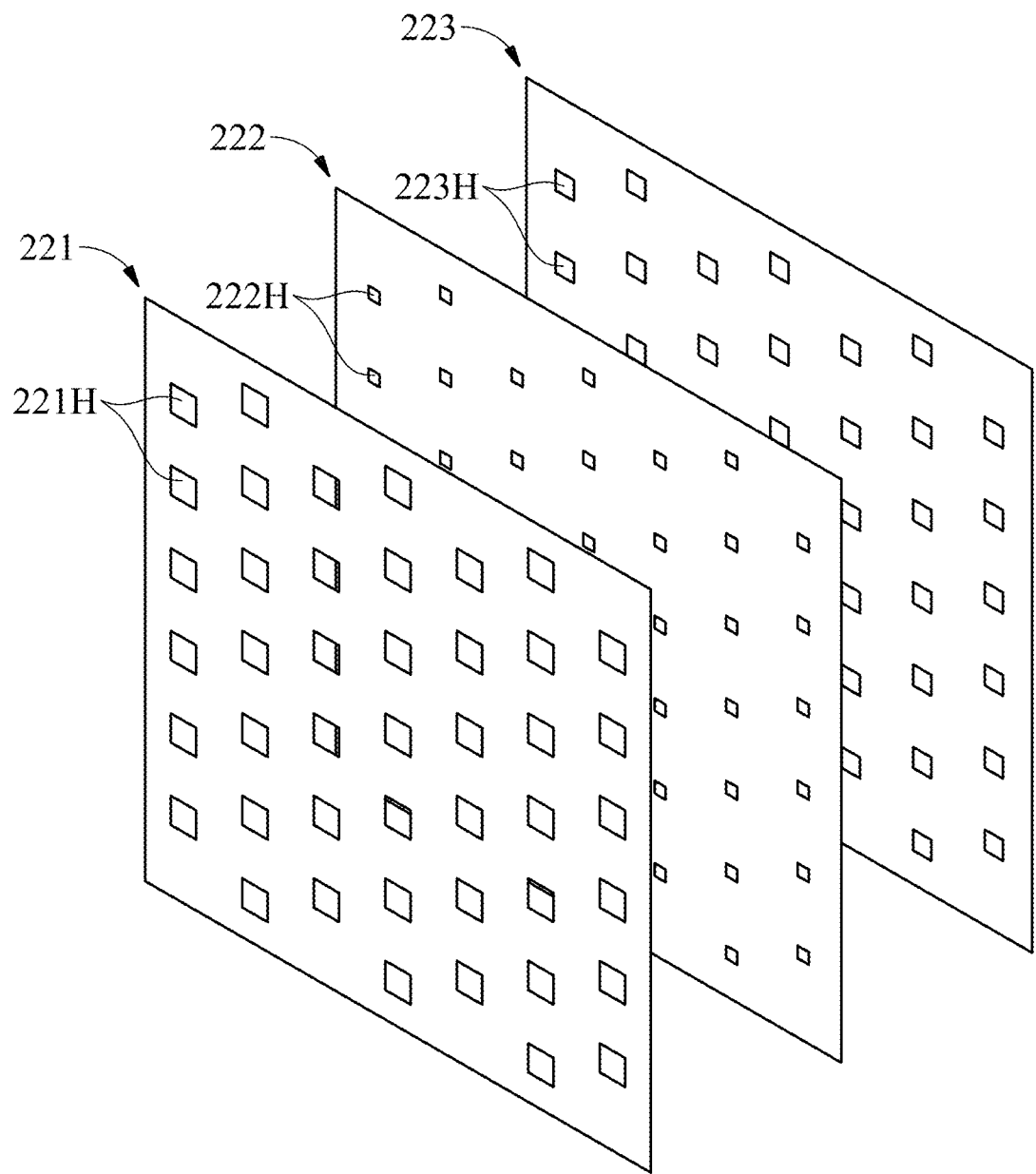
FIG. 3 is a schematic diagram of the expanded porous dispersion structure with three porous dispersion layers.

Please refer to FIGS. 1 and 3, in this embodiment, the aforementioned porous dispersion structure 22 has a plurality of porous dispersion layers: a first porous dispersion layer 221, a second porous dispersion layer 222, and a third porous dispersion layers 223, which are adjacent to each other. The second porous dispersion layer 222 is located between the first porous dispersion layer 221 and the third porous dispersion layer 223, and the first to third porous dispersion layers 221 to 223 sequentially surrounds the central axis 22C of the porous dispersion structure 22 to form a second receiving space SP2, and the second receiving space SP2 has an opening OP.

Continuing to refer to FIGS. 1 and 3, the porous dispersion structure 22 has the second receiving space SP2, and the initial slurry SL is placed in the second containing space SP2. When the slurry dispersion process is performed, by the rotation process or the relative movement, the slurry SL passes from the second receiving space SP2 through the porous dispersion layers 221 to 223 of the porous dispersion structure 22 to the first receiving space SP1, and then flows back into the second receiving space SP2. The slurry dispersion is repeatedly performed back and forth between the first and second receiving spaces SP1 and SP2. Through each of the porous dispersion layers 221-223 of the porous dispersion structure 22, the slurry SL can be dispersed into smaller particles to achieve dispersing the slurry. In addition, the porous dispersion structure 22 has a skeleton 22BD, which can be used to support the aforementioned plurality of porous dispersion layers 221 to 223, which is conducive to bonding or adjoining the three, and can strengthen the overall structural strength of the porous dispersion structure 22.

As for the details of the porous dispersion structure 22, each of the porous dispersion layers 221 to 223 has a plurality of pores (or openings): a plurality of first pores 221H, a plurality of second pores 222H, and the plurality of third pores 223H. The pore size (or maximum pore length) of the second pore 222H is smaller than the pore sizes of the first pore 221H and the third pore 223H. That is, the second porous dispersion layer 222, the intermediate layer, has the smallest pores. In some embodiments, the relative sizes of the pores of the first, second, and third porous dispersion layers 221, 222, and 223 are: large-small-medium. In some embodiments, the pore size ratios of the first, second, and third pores 221H, 222H, and 223H are 3.1:1:2.1 to 12:1:3.

In some embodiments, the relative pore size of the first, second, and third porous dispersion layers 221, 222, and 223 are: medium-small-large. That is, the first porous dispersion layer 221, the innermost layer, has a medium pore 221H, the second porous dispersion layer 222, the middle layer, has the smallest pore 222H, and the third porous dispersion layer 223, the outermost layer, has the largest pore 223H. In some embodiments, the first, second, and third pores 221H, 222H, and 223H have a size ratio of the first, second, and third pores of 2.1:1:3.1 to 3:1:12.

Figure 4:
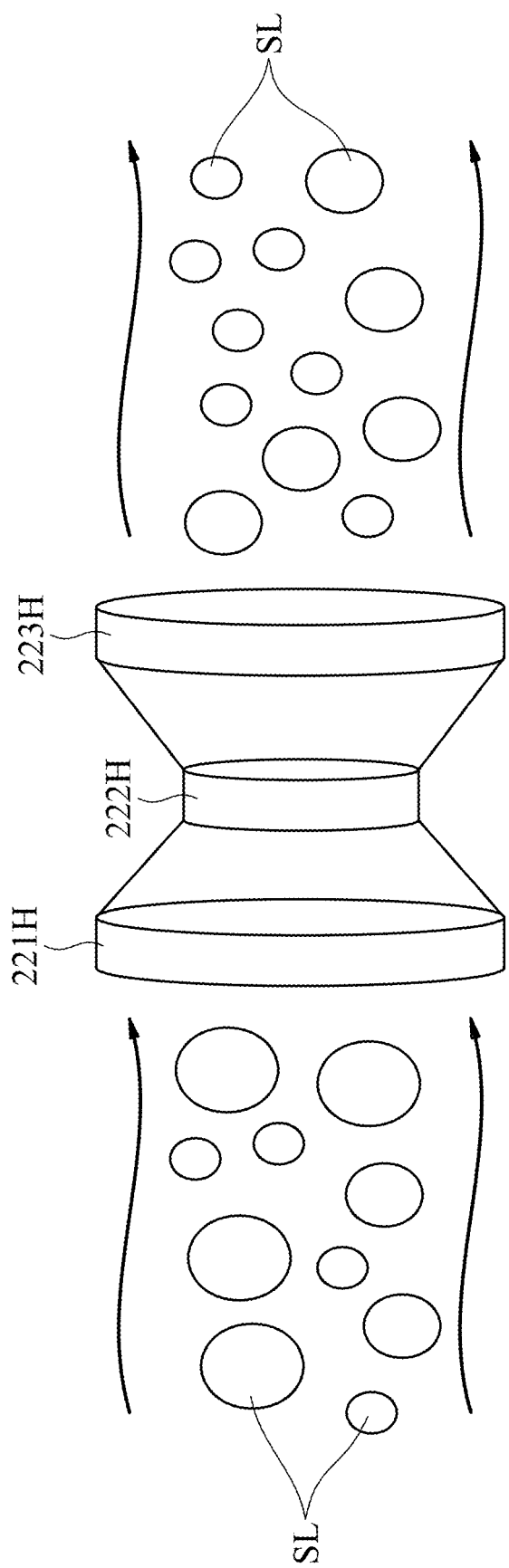
FIG. 4 is a schematic diagram of the slurry passing through the first, second, and third pores in sequence.

As shown in FIG. 4, when the slurry dispersion process is performed, the slurry SL near the central axis 22C will sequentially pass through the first porous dispersion layer 221, the second porous dispersion layer 222, and the third porous dispersion layer 223 passes through the first pore 221H having the largest pore size (or opening size), the second pore 222H having the smallest opening size, and the third pore 223H having the medium opening size in order.

The porous dispersion structure 22 has three layers, and the pore size of the middle layer is the smallest (relative to the pore sizes of the dispersion layers on both sides). When the slurry dispersion process is performed, the slurry SL sequentially passes through the pores 221H, 222H, 223H will produce a strong turbulent diffusion effect, so that the slurry dispersion system 100 provides a more uniform shear force, and can eliminate the dead angle of flow in a small area, so that the randomness of the slurry dispersion system 100 is effectively improved, and then the dispersion effectiveness is improved. In some embodiments, the aperture ratios of the first porous dispersion layer 221, the second porous dispersion layer 222, and the third porous dispersion layer 223 (i.e., a total pore area/a total area of the dispersion layer) is 15%-20%, 1%-1.5% and 5%-10%, respectively. In other embodiments, the aperture ratios of the first porous dispersion layer 221, the second porous dispersion layer 222, and the third porous dispersion layer 223 are 17%, 1.4%, and 7%.

Figure 5A:
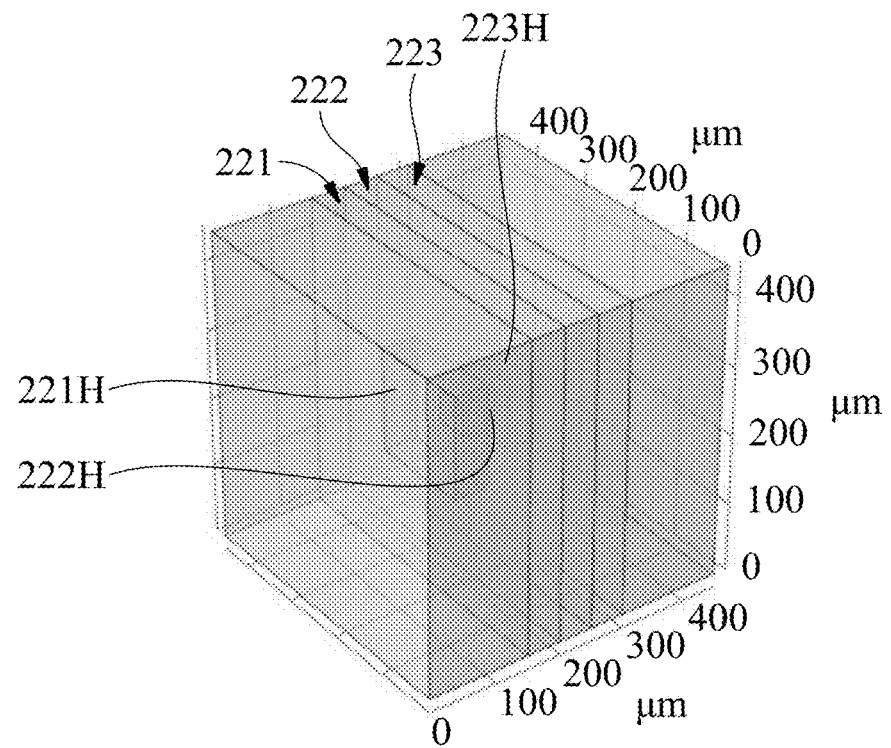
FIG. 5A is a schematic diagram of the partial porous dispersion structure and the vortex field.
Figure 5A:
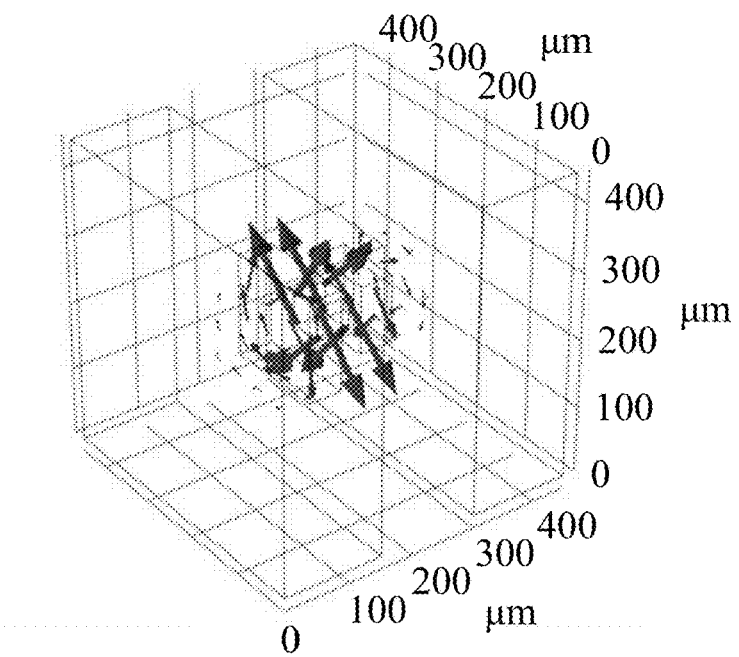

As shown in FIG. 5A, the pore sizes of porous dispersion structure 22 is arranged in large-small-medium sequence has a high-intensity vortex. Compared to a single layer or a double layer porous dispersion structure having the same pore size or a double layer porous dispersion structure with different pore sizes, the porous dispersion structure 22 can generate stronger shearing force, and then improve dispersion efficiency. In this embodiment, the shape of each of the pores 221H-223H is square. In other embodiments, the shape may be a circle, an oval, a rectangle, a polygon, or a combination thereof. In some embodiments, the polygon may be a triangle, a quadrangle, a pentagon, a hexagon, or a heptagon. When the polygon is larger than seven sides, the intensity of the vortex formed is reduced, which is not conducive to the dispersion of the slurry.

Figure 5B:
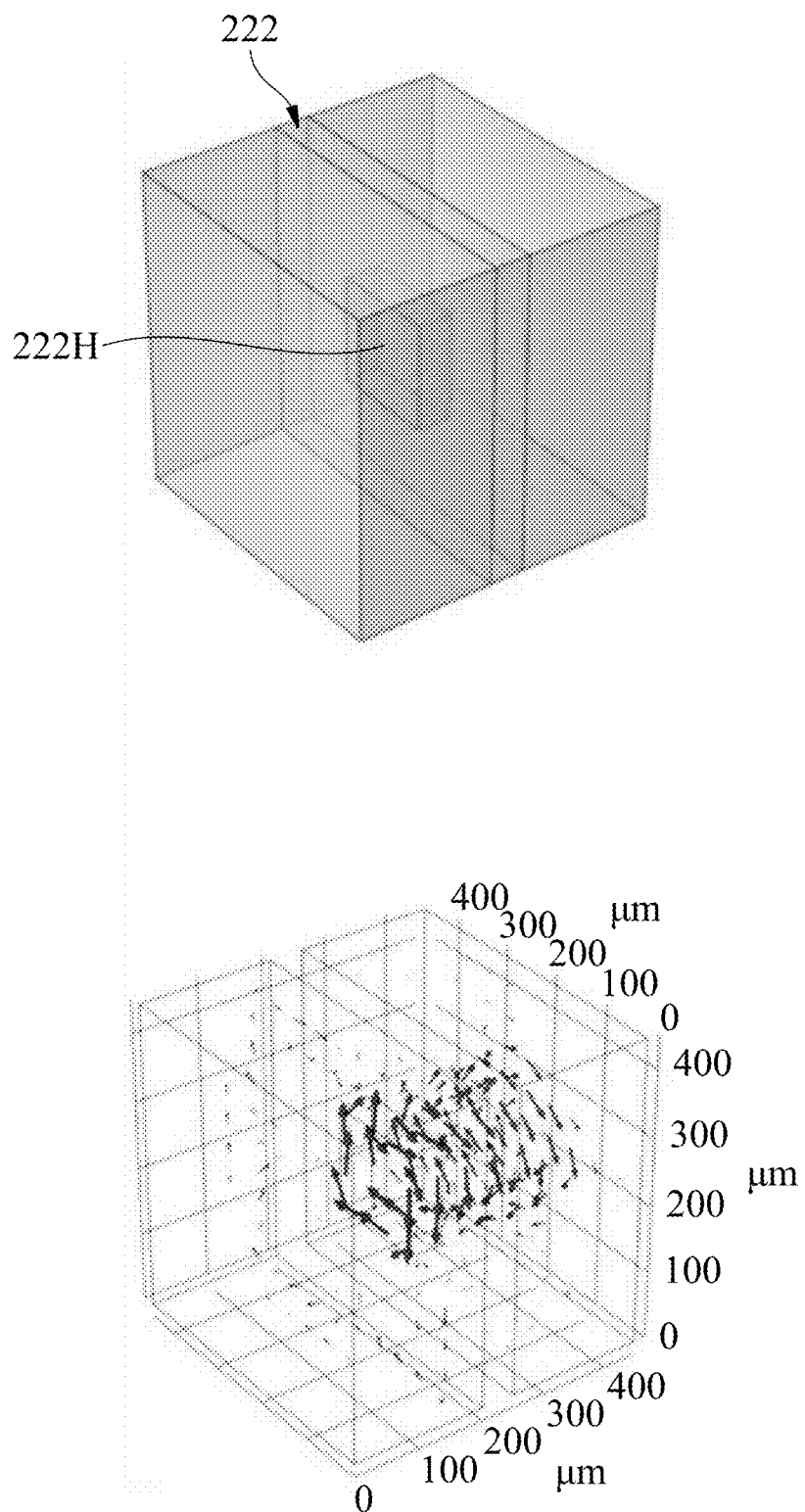
FIG. 5B is a schematic diagram of the partial second porous dispersion layer and its vortex field.

FIG. 5B shows the second pore 222H of the second porous dispersion layer 222 having a pore size of 150 and the area of the unopened area (i.e., the closed area): pore size area=3:1 according to an embodiment of the present invention. When the thickness of the second dispersion layer 222 is large, the slurry can be subjected to a longer process time during the process, which can improve the efficiency of the process; however, if the thickness is too large, the process efficiency and output will be reduced. The thickness of the second dispersion layer 222, for example, can be 50 μm to 500 μm, or between 100 μm to 300 μm. In this configuration, the turbulence of the vortex field can extend from the entrance of the pore to the open area of the exit of the rear portion, providing a better dispersion effect.

Figure 6A:
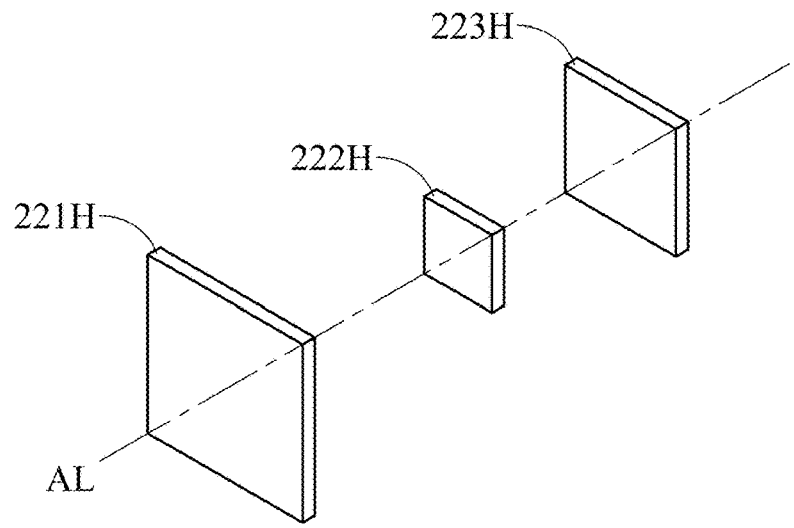
FIGS. 6A to 6C are schematic diagrams showing the arrangement relationship and different shapes of different types of pores.
Figure 6B:
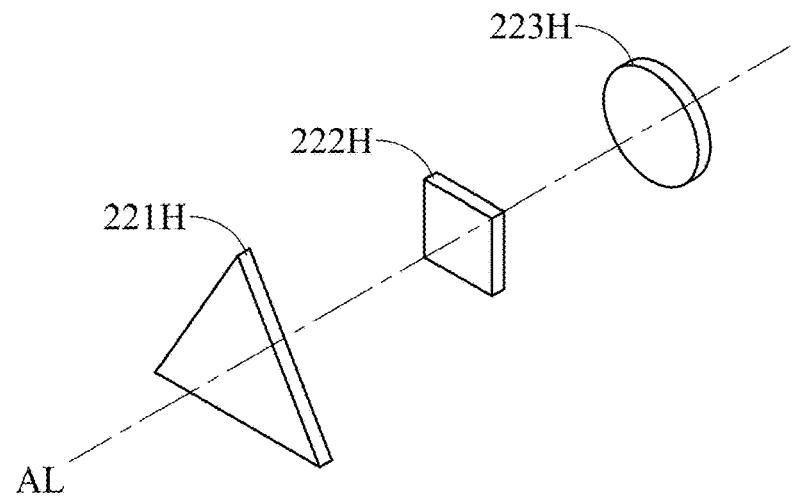
Figure 6C:
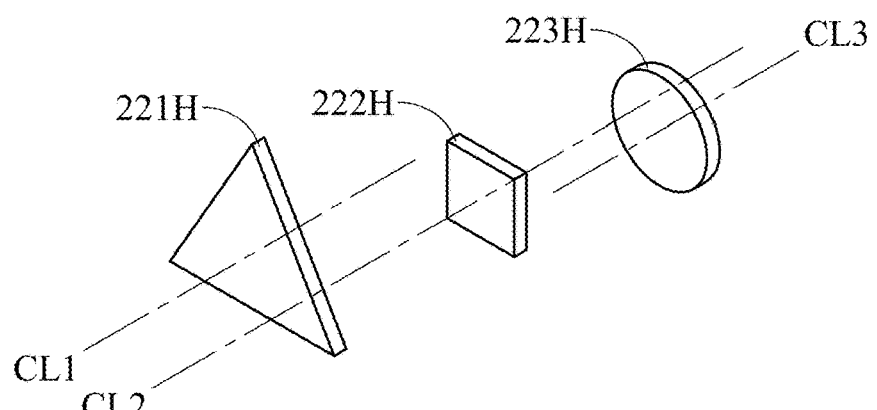

FIGS. 6A to 6C are schematic diagrams showing the arrangement relationship and different shapes of the pores 221H, 222H, and 223H of different types of different dispersion layers. As shown in FIG. 6A, in some embodiments, the first, second, and third pores 221H, 222H, and 223H of the porous dispersion structure 22 are on the same axis AL (which may be perpendicular to the central axis 22C of the porous dispersion structure 22), that is, the center lines of these pores are coincident. Those pores have the same pore shape as the square, which can provide a strong vortex field. In some embodiments, at least two of the center lines of the pores 221H, 222H, and 223H are coincident.

In some embodiments, as shown in FIG. 6B, the first, second, and third pores 221H, 222H, and 223H may have different shapes, and the center lines of these different pores 221H, 222H, and 223H are coincident with each other, that is, they are located on the same axis AL. Different shapes can be, for example, regular triangles, squares and circles.

FIG. 6C shows that in some embodiments, the respective center lines CL1, CL2, and CL3 of the first, second, and third pores 221H, 222H, and 223H do not coincide, that is, the center lines CL1, CL2, and CL3 are not on the same axis, but the pores 221H, 222H, 223H overlap at least partially in a direction that is perpendicular to the central axis 22C of the porous dispersed structure 22.

In other embodiments, the pores of different shapes (as shown in FIG. 6B), the respective center lines of the pores may coincide on an axis AL (as shown in FIG. 6A), and the respective center lines of the pores do not coincide on an axis AL, but these pores at least partially overlap in a direction perpendicular to the central axis 10C of the porous dispersed structure 22 (as shown in FIG. 6C), can be combination.

Figure 7:
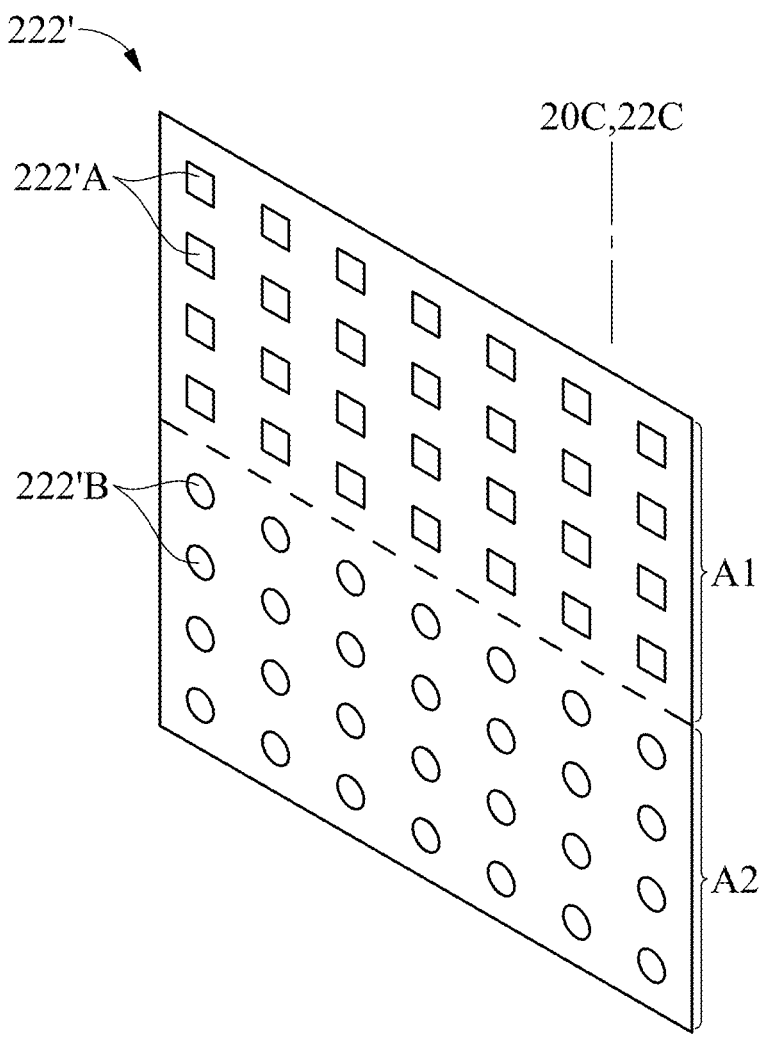
FIG. 7 is a partial schematic view showing a second porous dispersion layer according to another embodiment of the present invention.

FIG. 7 is a partial schematic view showing a second porous dispersion layer 222' according to another embodiment of the present invention. The second porous dispersion layer 222' has two regions: a first region A1 and a second region A2, which are arranged along the central axis 22C of the porous dispersion structure 22. The pores 222H'A in the first region A1 have a square structure, and the pores 222H'B in the second region A2 have a circular structure. In this way, the second porous dispersion layer 222' uses different shapes of pores which are disposed in the upper and lower regions. Compared to the porous dispersion layer with the same pore shape, the disturbance of the slurry SL can be strengthened, and the uniformity of the slurry can be improved, or shorten the time to execute the dispersion program, to improve the efficiency of the dispersion slurry.

In some embodiments, the area ratio between the first area A1 and the second area A2 may be 3:7 to 7:3, for example, 5:5.

In some embodiments, the aforementioned first and third porous dispersion layers 221, 223 may also have a second porous dispersion layer 222' configured as shown in FIG. 7 with pores of different shapes provided in different regions thereof.

Figure 8:
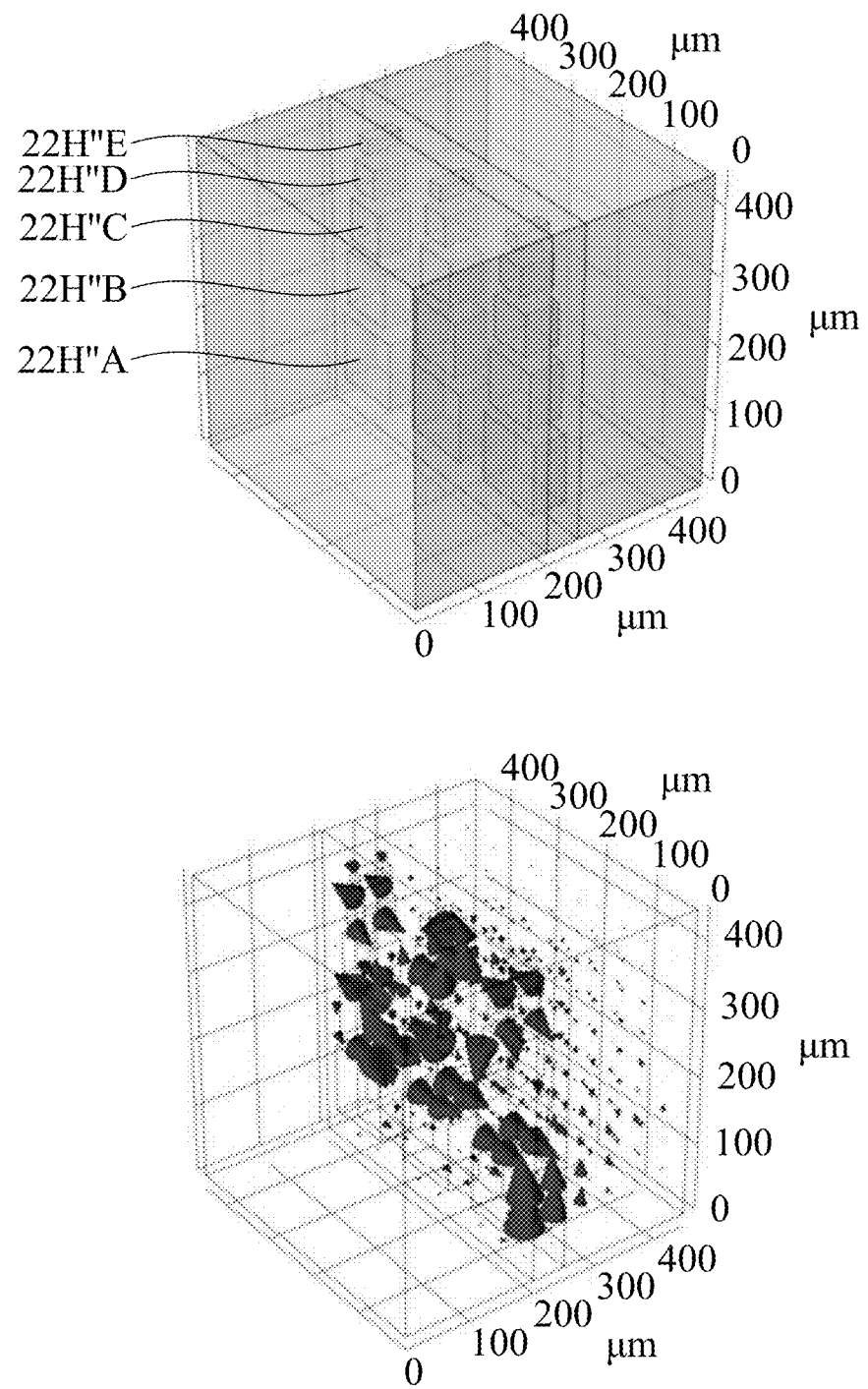
FIG. 8 is a schematic diagram showing a part of a second porous dispersion layer and its vortex field according to another embodiment of the present invention.

FIG. 8 is a schematic diagram showing a part of the second porous dispersion layer 222" and the vortex field thereof according to another embodiment of the present invention. The second porous dispersion layer 222" includes pores 222H"A, 222H"B, 222H"C, 222H"D, and 222H"E with different pore sizes. The above-mentioned pores of different sizes, in the direction away from the rotation device 10, are pores 222H"A, 222H"B, 222H"C, 222H"D, and 222H"E, which the pore sizes are getting smaller in order. That is, in the direction away from the rotation device 10, the pore sizes decrease in order. This configuration can produce a more powerful vortex field than the pores arranged in random order (that is, not arranged in order).

In some embodiments, the aforementioned first and third porous dispersion layers 221, 223 may also have a second porous dispersion layer 222" configured as shown in FIG. 8 with sequential pore sizes.

Figure 9:
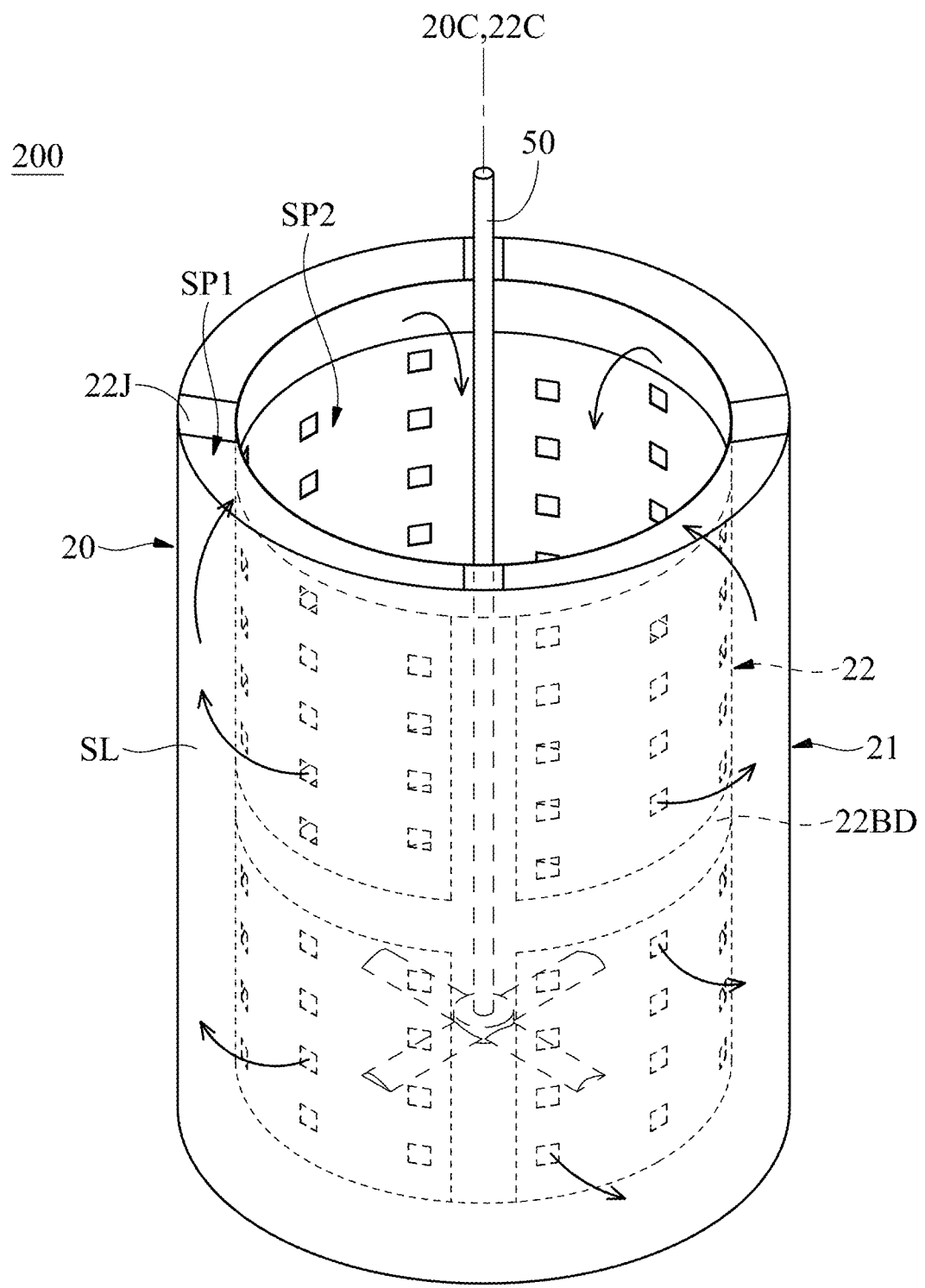
FIG. 9 is a schematic diagram showing a slurry dispersion system according to another embodiment of the present invention.

FIG. 9 is a schematic diagram showing a slurry dispersion system 200 according to another embodiment of the present invention. Compared with the slurry dispersion system 100 in FIG. 1, the slurry dispersion system 200 of this embodiment further comprises an agitating member 50 disposed in the second receiving space SP2 of the porous dispersion structure 22. The agitating member 50 may be an agitating rod and may be connected to the outer cover 23 in FIG. 2 to agitate the slurry SL, which may increase the disturbance of the slurry SL, thereby improving the slurry dispersing ability of the slurry dispersing system 200.

The features between the above embodiments can be mixed and used as long as they do not violate the spirit of the disclosure of the present invention or conflict with each other.

In summary, an embodiment of the present invention provides a dispersion device, including a container and a porous dispersion structure. The container has a first receiving space. The porous dispersion structure has at least three porous dispersion layers and has a second receiving space, wherein the porous dispersion structure is located in the first receiving space of the container.

An embodiment of the invention provides a slurry dispersion system, configured to disperse a slurry, comprising: a rotation device and a dispersion device. The rotation device is configured to contain the slurry, includes: a container and a porous dispersion structure. The container is provided on the rotation device and having a first receiving space, and the porous dispersion structure has at least three porous dispersion layers and a second receiving space, and the porous dispersion structure is located in the first receiving space of the container. When the rotation device rotates, the rotation device drives the dispersion device to rotate to disperse the slurry.

The embodiment of the present invention has at least one of the following advantages or effects, in that through the porous dispersion structure of the slurry dispersion layer with at least three layers, the dispersion effect on the slurry can be improved, and the dispersion process time is shortened. In addition, the middle layer of the three-layer dispersion layer has the smallest pores, which can make the porous dispersion structure have a stronger vortex field, generate stronger turbulent disturbances, and greatly improve the dispersion force for the slurry.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A dispersion device, comprising:
   a container, having a first receiving space; and
   a porous dispersion structure, having at least three porous dispersion layers, and having a second receiving space, wherein the porous dispersion structure is located in the first receiving space of the container and includes:
      a first porous dispersion layer, having a first pore size;
      a second porous dispersion layer, having a second pore size; and
      a third porous dispersion layer, having a third pore size, wherein the second porous dispersion layer is located between the first porous dispersion layer and the third porous dispersion layer, and the second pore size is smaller than the first pore size and the third pore size in the direction along a center axis of the porous dispersion,
      wherein a central line of a first pore of the first porous dispersion layer, a central line of a second pore of the second porous dispersion layer, and a central line of a third pore of the third porous dispersion layer are located on an axis, and the axis is perpendicular to the central axis of the porous dispersion structure.

2. The dispersion device as claimed in claim 1, wherein the first pore size is larger than the third pore size.

3. The dispersion device as claimed in claim 2, wherein a ratio of the first pore size, the second pore size, and the third pore size is between 3.1:1:2.1 to 12:1:3.

4. The dispersion device as claimed in claim 1, wherein the first pore size is smaller than the third pore size.

5. The dispersion device as claimed in claim 4, wherein a ratio of the first pore size, the second pore size, and the third pore size is between 2.1:1:3.1 to 3:1:12.

6. The dispersion device as claimed in claim 1, wherein a thickness of the second porous dispersion layer is between 50 µm and 500 µm.

7. The dispersion device as claimed in claim 1, wherein:
   in a direction that is perpendicular to the central axis of the porous dispersion structure, a first pore of the first porous dispersion layer, a second pore of the second porous dispersion layer, and a third pore of the third porous dispersion layer at least partially overlap.

8. The dispersion device as claimed in claim 1, wherein one of the porous dispersion layers of the porous dispersion structure has two regions: a first region and a second region, which are arranged along the central axis of the porous dispersion structure, and the one of the porous dispersion layers has a plurality of first pores located in the first region and a plurality of second pores located in the second region, wherein a shape of the first pores is different from a shape of the second pores.

9. The dispersion device as claimed in claim 8, wherein an area ratio of the first region to the second region is 3:7 to 7:3.

10. The dispersion device as claimed in claim 1, wherein one of the porous dispersion layers of the porous dispersion structure has a plurality of pores with different pore sizes, and the sizes of the pores decrease in order along an opening direction of the second receiving space.

11. The dispersion device as claimed in claim 1, wherein a pore shape of the porous dispersion layers has a polygonal shape, and the polygonal is triangle, quadrilateral, pentagon, hexagon, or heptagon.

12. A slurry dispersion system, configured to disperse a slurry, comprising:
   a rotation device; and
   a dispersion device, configured to contain the slurry, including:
      a container, provided on the rotation device and having a first receiving space; and
      a porous dispersion structure, having at least three porous dispersion layers and a second receiving space, and the porous dispersion structure located in the first receiving space of the container and includes:
         a first porous dispersion layer, having a first pore size;
         a second porous dispersion layer, having a second pore size; and
         a third porous dispersion layer, having a third pore size, wherein the second porous dispersion layer is located between the first porous dispersion layer and the third porous dispersion layer, and the second pore size is smaller than the first pore size and the third pore size in the direction along a center axis of the porous dispersion, wherein a central line of a first pore of the first porous dispersion layer, a central line of a second pore of the second porous dispersion layer, and a central line of a third pore of the third porous dispersion layer are located on an axis, and the axis is perpendicular to the central axis of the porous dispersion structure, wherein when the rotation device rotates, the rotation device drives the dispersion device to rotate to disperse the slurry.

* * * * *